April 21, 1953      E. C. HUTCHINS      2,636,104

ELECTRICAL APPARATUS

Filed Sept. 15, 1951      2 SHEETS—SHEET 2

INVENTOR.
Everett C. Hutchins
BY
Willits Hardman and Fehr
attorneys

Patented Apr. 21, 1953

2,636,104

UNITED STATES PATENT OFFICE 2,636,104

ELECTRICAL APPARATUS

Everett C. Hutchins, Dayton, Ohio, assignor to General Motors Corporation, Dayton, Ohio, a corporation of Delaware Application September 15, 1951, Serial No. 246,829

7 Claims. (Cl. 219—10)

This invention relates to electrical apparatus and more particularly to a method of electrically welding tubing to an extensive metal surface.

Tubing has been bonded to extensive metal surfaces in many different ways. This has been an expensive manufacturing operation regardless of the method used. In the more simple ways, much labor was required.

It is an object of my invention to provide a simple inexpensive method of bonding tubing to metal surfaces which requires little labor and which can be performed rapidly.

It is another object of my invention to use tubing of such a shape and to apply the tubing in such a way to the metal surface that the tubing can be easily and rapidly electrically welded to the metal surface.

According to my invention, I use flat-sided tubing such as square tubing and turn the tubing so that the one corner will contact the metal surface. V-grooved welding rolls are used to progressively force the corner of the tubing firmly into contact with the metal surface and at the same time an electric current is passed from the welding roll through the tubing to the metal surface at a sufficient rate to weld the tubing to the metal surface.

Further objects and advantages of the present invention will be apparent from the following description, reference being had to the accompanying drawings, wherein a preferred form of the present invention is clearly shown.

Figure 1:
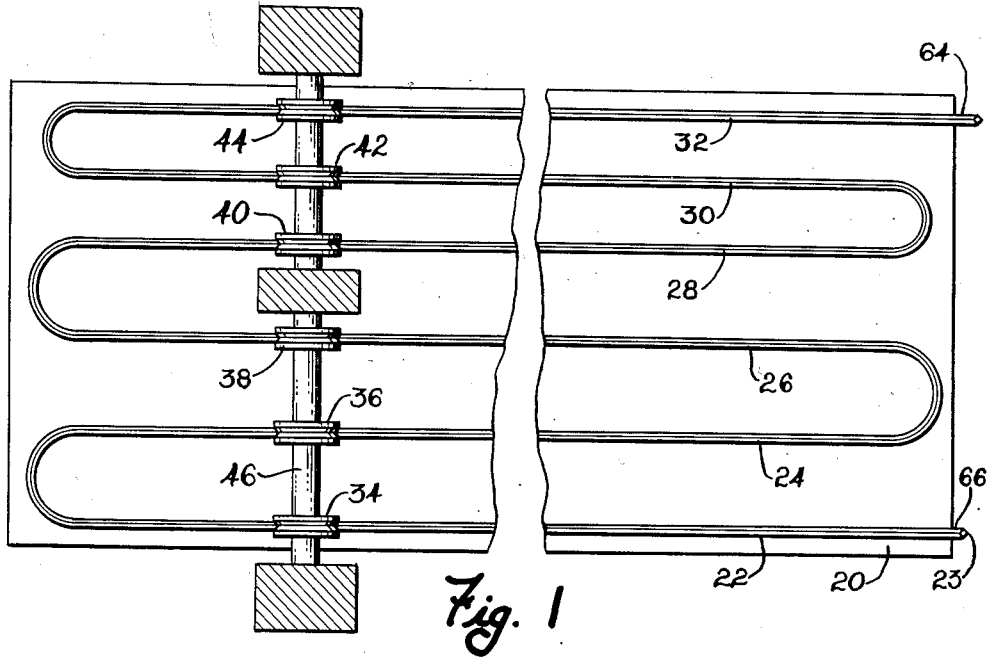
Fig. 1 is a plan view illustrating diagrammatically the welding of square tubing to an extensive metal surface.

Referring now to the drawings and more particularly to Fig. 1, there is shown an extensive sheet of metal 20 such as sheet steel to which tubing is to be bonded. It has always been a difficult problem to bond tubing to an extensive metal surface. Commonly, copper tubing is soldered by hand methods to the sheet steel. The copper tubing is expensive and the soldering methods are likewise expensive and not always reliable. It has not been practical to weld ordinary tubing to sheet steel because the tubing would not withstand the necessary pressure required to provide a good weld.

To make it possible to weld tubing to the sheet steel 20, I use square steel tubing, designated by the reference characters 22, 24, 26, 28, 30 and 32, and turn the tubing so that one corner 23 or one edge of the tubing is presented to the sheet steel. For the purpose of this particular application, the tubing is first bent into serpentine shape and has long straight passes 22, 24, 26, 28, 30 and 32. In the entire serpentine formation, however, the corner 23 is presented to the sheet steel 20.

Figure 2:
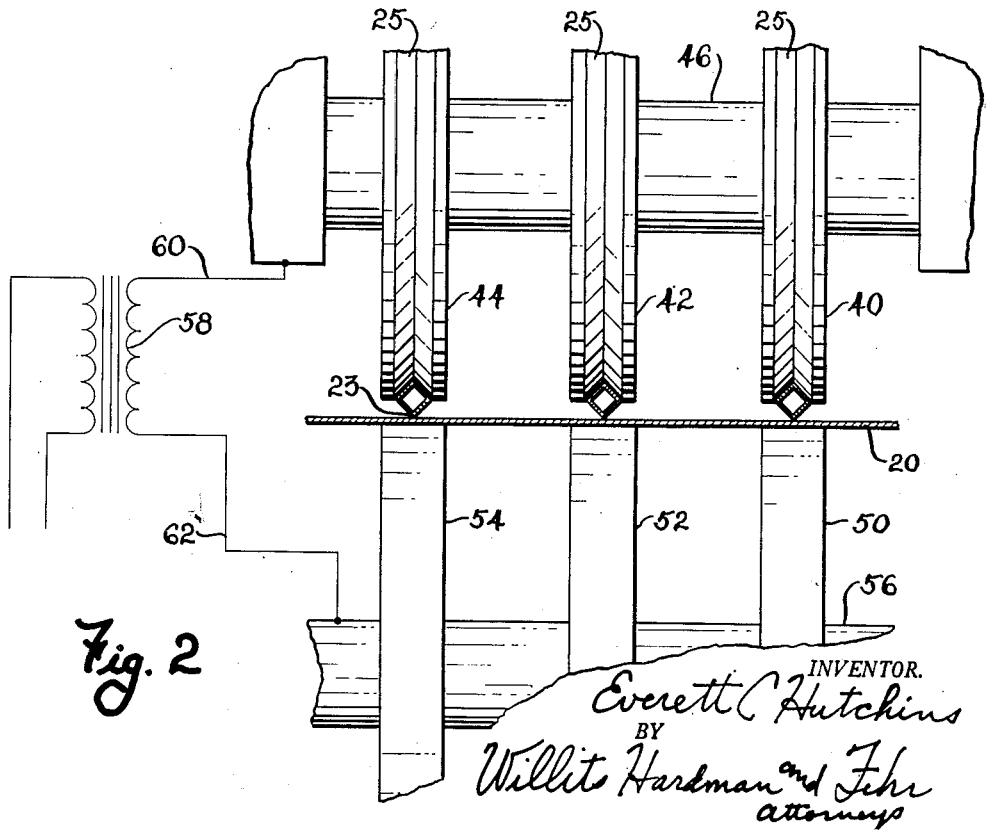
Fig. 2 is a fragmentary partly diagrammatic vertical sectional view showing the parallel welding of the square tubing to the metal surface.

The sheet steel 20 with the square tubing in the serpentine formation is then presented to a multiple roll type welding machine having 90° V-grooves 25 in the upper rolls sufficiently deep to receive the upper half of the square tubing as best shown in Fig. 2. The tubing has stiff straight sides extending between the grooves 25 and the corner 23. The upper grooved rolls are designated by the reference characters 34, 36, 38, 40, 42 and 44. These upper rolls are spaced upon the rotatable shaft 46 distances equal to the spacing of the straight passes 22, 24, 26, 28, 30 and 32. The sheet 20 is supported by flat-surfaced rolls beneath the grooved rolls designated by the reference characters 50, 52, and 54 which are mounted upon the rotatable shaft 56.

The sheet 20 and the serpentine tubing are first placed so that one end of each straight pass of the serpentine tubing is placed beneath the grooved rolls with the sheet 20 resting upon the lower rolls. The grooved rolls are forced together to provide sufficient welding pressure between the edge or corner 23 of the square tubing and the adjacent portion of the sheet 20.

The straight sides of the tubing extending between the grooves 25 and the corner 23 make it possible to apply sufficient welding pressure to the corner 23 to obtain a good weld. For example, when a 22 gauge sheet is used I prefer to use a welding pressure of about 590 or 600 lbs. but any suitable welding pressure may be used up to the limit of the strength of the straight sides of the tubing. The corner 23 has an area sufficiently limited in width and yet sufficiently wide to provide a strong weld with the sheet 20 adequate to provide good heat transfer between the tubing and the sheet 20.

A welding transformer 58 is shown diagrammatically and its secondary winding has one terminal connected by the conductor 60 to the rotatable shaft 46 and a second terminal connected by the conductor 62 to the rotatable shaft 56. The transformer 58 is supplied from a suitable alternating current source and provided with suitable welding controls.

In the manner of roll spot welding and seam welding machines, the rollers move the tubing and the sheet 20 as a unit so as to progressively apply the corner 23 of the tubing to the sheet 20 beginning at one end of each of the straight passes and proceeding to the other end as the welding current is passed from the tubing to the sheet 20 to progressively weld the tubing to the sheet 20 as the tubing and the sheet 20 pass between the upper and lower rolls. The tubing and the sheet 20 may be cooled continuously by cooling fluid flowing through or over them.

After the welding operation is completed, the tubing is firmly bonded to the sheet 20 and the welded structure may then be folded or bent as a unit into any desired shape to form a heat exchange unit. For example, in Fig. 3 the sheet 20 is folded into the form of a rectangle to form side walls of the inner container of a frozen food cabinet or an ice cream cabinet. The two ends of the tubing designated by the reference characters 64 and 66 are connected to a refrigerant liquefying unit (not shown) to receive liquid refrigerant to provide refrigeration for the interior of the container. The container so formed is enclosed within an insulated cabinet shown in the form of dot-and-dash lines bearing the reference character 68.

Although I prefer to use square tubing since it provides the greater number of advantages, it is possible to use other forms of flat-sided tubing such as triangular tubing and pentagonal tubing. In this case, the upper rolls will be provided with grooves which correspond to the upper portion of the tubing and always apply the tubing so that one corner of the tubing is presented to the sheet 20 to which it is to be bonded. While I prefer to use steel tubing and steel sheets, it is possible to use other materials such as aluminum tubing and aluminum sheets.

Figure 3:
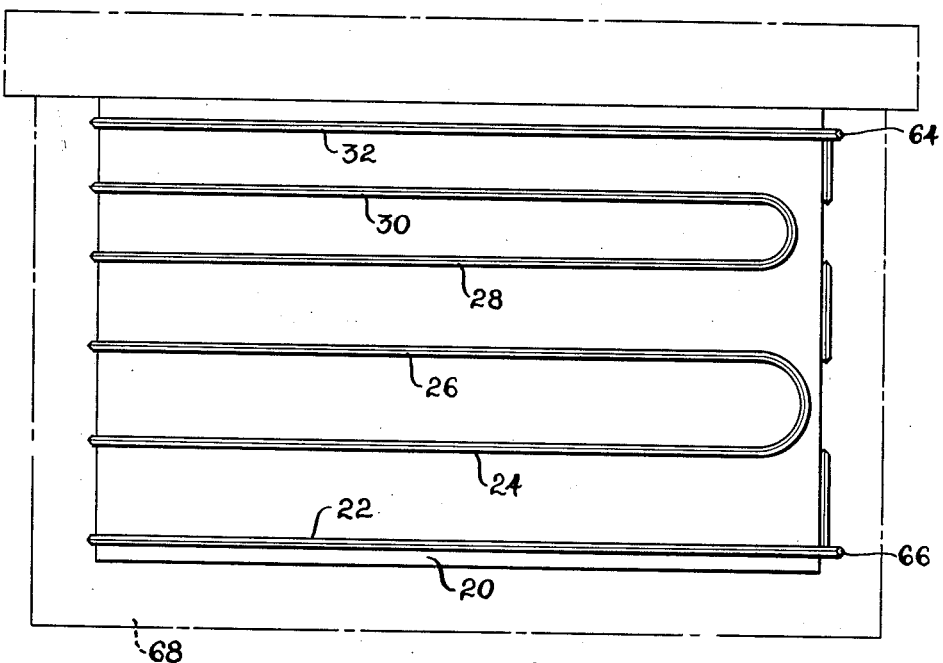
Fig. 3 is a view in elevation showing a refrigerant evaporating means formed of the tubing and metal sheet shown in the welding operation in Fig. 1.

Although I have shown diagrammatically in Figs. 1 to 3 a simple welding transformer arranged to apply welding current in parallel electrical circuit arrangement to the rolls, if desired, other welding arrangements such as multiple welding or series welding arrangements may be used. For example, the welding arrangements shown in Fig. 13 on page 379 of the Welding Handbook, Third edition, published by the American Welding Society may be used instead of the form shown.

Figure 4:
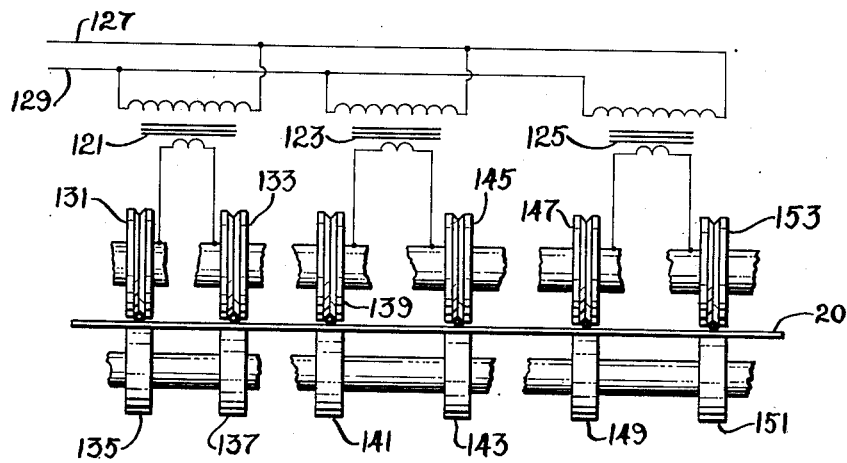
Fig. 4 is a fragmentary partly diagrammatic vertical sectional showing the use of three series welding arrangements for simultaneously welding six passes of the square tubing to the metal surface.

In Fig. 4 is shown one example of multiple series welding for simultaneously welding the six straight passes of the square tubing with the corners in contact with the sheet 20 as explained in connection with Figs. 1 to 3. In Fig. 4 three welding transformers 121, 123 and 125 are connected in parallel to the supply conductors 127 and 129. Suitable welding controls, not shown, may be provided. One terminal of the secondary of the transformer 121 is connected to the V-grooved welding roll 131 while the second terminal is connected to the V-grooved welding roll 133. The first two passes of the square tubing are applied to the sheet 20 by these rolls 131 and 133. These rolls 131 and 133, are of course, insulated from each other. Beneath the sheet 20 there is provided a pair of flat surfaced rolls 135 and 137 which are electrically connected. The secondary circuit extends from the transformer 121 through the roll 131, the first pass of square tubing, through the sheet 20 to the roll 135, thence to the roll 137, back through the sheet 20 and the second pass of square tubing and the roll 133 to the transformer secondary.

In a similar way the secondary of the transformer 123 is connected to the V-grooved welding roll 139 which applies a third pass of square tubing to the sheet 20. Beneath the sheet 20 is the flat surfaced roll 141 which is electrically connected to the flat surfaced roll 143, likewise beneath the sheet 20. Above the sheet 20 is the V-grooved welding roll 145 which applies a fourth pass of square tubing to the sheet 20. It is electrically connected to the second terminal of the secondary of the transformer 123 to complete the welding circuit.

One terminal of the secondary of the transformer 125 is connected to the V-grooved welding roll 147 which applies the fifth pass of square tubing to the sheet 20. Beneath the sheet 20 there is provided a flat surfaced roll 149 which is electrically connected to the flat surfaced roll 151, likewise beneath the sheet 20. Above the roll 151 there is provided a sixth V-grooved welding roll 153 for applying the sixth pass of tubing to the sheet 20. It is insulated from the roll 147 and is electrically connected to the second terminal of the secondary of the welding transformer 125.

Thus, in this arrangement the three welding transformers 121, 123, and 125 each have their secondaries connected to a series welding circuit which includes the two separated insulated V-grooved welding rolls and two electrically connected flat surfaced welding rolls beneath the sheet 20. This arrangement insures substantially even current flow as the passes of square tubing are progressively rolled and welded as the sheet 20 and the six passes of square tubing are passed progressively from one end to the other between the rolls.

While the form of embodiment of the invention as herein disclosed constitutes a preferred form, it is to be understood that other forms might be adopted, as may come within the scope of the claims which follow.

What is claimed is as follows:

1. The method of bonding flat sided tubing to an extensive metal surface which includes forcing one of the corners of the tubing into firm contact with the metal surface and while the tubing is so held passing an electric current at a sufficient rate for a sufficient time through the point of contact to weld said one corner to the metal surface.

2. The method of bonding flat sided tubing to an extensive metal surface which includes progressively forcing one of the corners edges of the tubing into firm contact with the metal surface and passing an electric current at a sufficient rate at the progressively moving point of contact to progressively weld the one edge of the tubing to the metal surface.

3. The method of bonding flat sided tubing to an extensive metal surface which includes progressively applying force to all except two adjacent sides of the tubing in such a direction as to progressively force the edge between the two adjacent sides firmly into contact with the extensive metal surface, and passing an electric current at a sufficient rate through the progressively moving point of contact of said edge with the extensive surface to progressively weld the edge to the extensive surface.

4. The method of welding flat sided tubing to the surface of an extensive metal member which includes progressively rolling the tubing with an edge in contact with said surface and passing an electric current between the point of rolling and the metal member at a sufficient rate to weld said edge progressively to said surface of said member.

5. The method of bonding flat sided tubing to an extensive metal surface which includes forming the tubing into a serpentine shape with long straight passes and with one of the corners of the tubing continuously projecting into contact with the hypothetical plane which would contact one side of the serpentine shaped tubing, placing the serpentine shaped tubing upon the extensive metal surface with said one corner contacting the metal surface, progressively forcing said one corner of the tubing into contact with the metal surface and passing an electric current at a sufficient rate between the tubing and the metal surface adjacent to and as said one corner is being progressively forced into contact with said metal surface to electrically weld the tubing to the metal surface.

6. The method of bonding flat sided tubing to an extensive metal surface which includes forming the tubing into a serpentine shape with long straight passes and with one of the corners of the tubing continuously projecting into contact with the hypothetical plane which would contact one side of the serpentine shaped tubing, placing the serpentine shaped tubing upon the extensive metal surface with said one corner contacting the metal surface, progressively forcing said one corner of each of said long straight passes simultaneously into contact with the metal surface and passing an electric current at a sufficient rate between the tubing and the metal surface at each point of progressive forcing of the corner into contact with the metal surface to simultaneously progressively electrically weld the long straight passes of the tubing to the metal surface.

7. The method of bonding flat sided tubing to an extensive metal surface which includes forming the tubing into a serpentine shape with long straight passes and with one of the corners of the tubing continuously projecting into contact with the hypothetical plane which would contact one side of the serpentine shaped tubing, placing the serpentine shaped tubing upon the extensive metal surface with said one corner contacting the metal surface, progressively applying force to all except the two sides adjacent said corner of the tubing in such a direction as to force said one corner of each of said long straight passes simultaneously into contact with the metal surface and passing an electric current at a sufficient rate between the tubing and the metal surface at each point of progressive forcing of the corner into contact with the metal surface to simultaneously progressively electrically weld the long straight passes of the tubing to the metal surface.

EVERETT C. HUTCHINS.

References Cited in the file of this patent
UNITED STATES PATENTS

| Number | Name | Date |
| --- | --- | --- |
| 1,228,789 | Lachman | June 5, 1917 |
| 2,127,685 | Greulich | Aug. 23, 1938 |
| 2,306,772 | Benson | Dec. 29, 1942 |
| 2,333,600 | Trautvetter | Nov. 2, 1943 |
| 2,359,926 | McCullough et al. | Oct. 10, 1944 |